Nov. 26, 1935.  G. A. LYON  2,022,123
BEADED TIRE COVER
Original Filed Aug. 26, 1931

Inventor
George Albert Lyon.
by
Attys.

Patented Nov. 26, 1935

2,022,123

UNITED STATES PATENT OFFICE 2,022,123

BEADED TIRE COVER

George Albert Lyon, Allenhurst, N. J., assignor to Lyon Incorporated, Asbury Park, N. J., a corporation of Delaware Original application August 26, 1931, Serial No. 559,389, now Patent No. 1,965,530, dated July 3, 1934. Divided and this application May 11, 1932, Serial No. 610,600

5 Claims. (Cl. 150—54)

This invention has to do with molding or beading for tire covers, particularly of that character embodying an outer ring or rim for overlying the tread of a tire.

In order that the detail structure of my tire cover as well as its fabrication may be fully understood, I shall describe it in conjunction with a process of and an apparatus for shaping it.

The present subject matter has been divided from my copending application Serial No. 559,389, filed August 26, 1931, issued as Patent No. 1,965,530, July 3, 1934.

It is an object of the invention to provide a tire cover member with means for anchoring the ends and intermediate portion of an ornamental and reinforcing and protective strip of metal or other suitable and preferably form-retaining material.

It is another object of the invention to provide a tire cover member with longitudinally arranged outwardly projecting means to be received by and prevent lateral relative movement of a strip of molding applied to the member.

A further object of the invention resides in the provision of a tire cover structure including a strip of molding, whereby the ends of one are secured to the other by loops.

Another object of the invention resides in the provision of a tire cover structure including a strip of molding secured to the cover member in such a manner that the securing means is substantially invisible and forms substantially no obstruction.

In the practice of the invention, a cover member such as that serving to cover the tread or other part of a spare tire or spare wheel is provided with a longitudinal rib and is cut to provide one or more anchor bars. A molding strip is placed above the rib so as to embrace the same to prevent relative sidewise movement of the cover member and strip, and the ends of the strip are looped about the bar or bars. This may be accomplished by doubling each end of the strip inwardly upon itself about the bar means so as to leave the outer surface of the strip smooth and unobstructed. The doubled portions are then united as by spot-welding or the like. The finished article has thus the appearance of an integral cover, yet the strip serves to ornament, reinforce and protect the surface of the cover member. The cover member and strip may be finished in any desired color or may be given any suitable rustless finish or may be made of rustless material, the two being of preferably pleasing contrasting colors, when assembled.

The construction has the additional advantage of being capable of manufacture by inexpensive operations.

Figure 2:
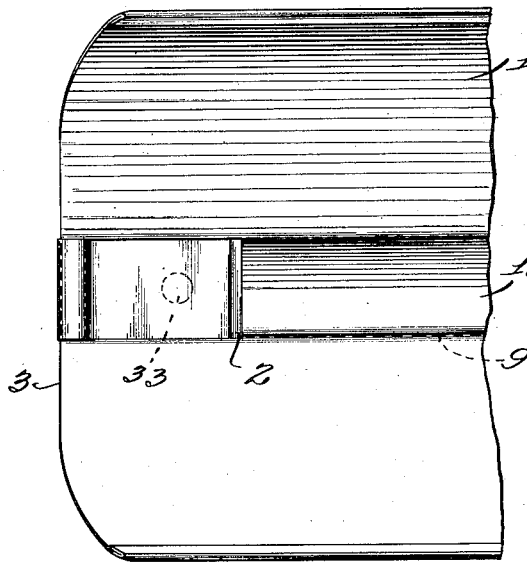
Figure 2 is an enlarged rear elevational view of one end of the tire cover showing the manner in which the beading is secured.

Referring now more particularly to the drawing, wherein the same reference characters are applied throughout to the same parts, the numeral 1 indicates a preferably metallic tire cover in the form of a split ring or rim. For the purpose of the present invention, the member 1 is cut out at 2 adjacent its ends 3 to provide anchor portions 4 integral with the member 1. The molding material comprises a preferably sheet metal strip 9 of the general character used in steel tapes and the like, and is of arcuate cross-sectional shape as indicated.

Any suitable means such as the pair of forming rolls 21 and 22 may be employed for forming a circumferential rib 1a on the tire cover member 1 and forcing the strip 9 thereover.

The radius of the transverse curvature of the convex surface of the rib 1a is somewhat greater than that of the normal concave surface of the strip 9 so that when the latter is forced onto the rib, the strip is flattened somewhat in a transverse direction. This flattening results in a tensioning of the strip so that the edges of the latter exert pressure upon the corresponding edge portions of the rib 1a in the tendency of the first mentioned edges to assume their normal positions. The tire cover member 1 being substantially round or arcuate and the strip 9 being normally substantially straight in a longitudinal direction, any tendency of the strip to buckle as it is caused to assume the longitudinal curvature of the rib 1a is overcome for the reason that the strip is somewhat flattened transversely when it is applied to the rib 1a and also for the reason that the rolls 21 and 22 are preferably so operated as to produce longitudinal tension in the strip.

Figure 3:
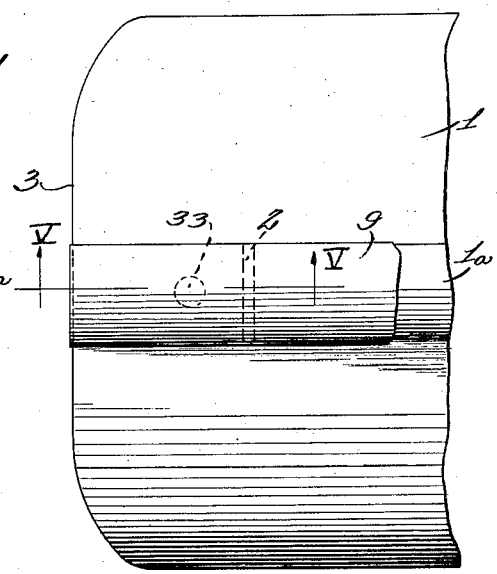
Figure 3 is a view similar to Figure 2 but showing the front of the tire cover.
Figure 1:
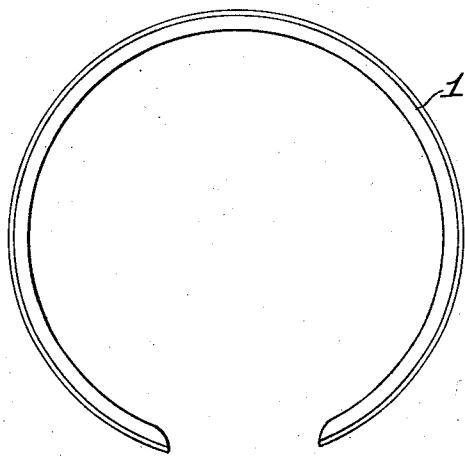
Figure 1 is an elevational view of a tire cover embodying the invention.
Figure 4:
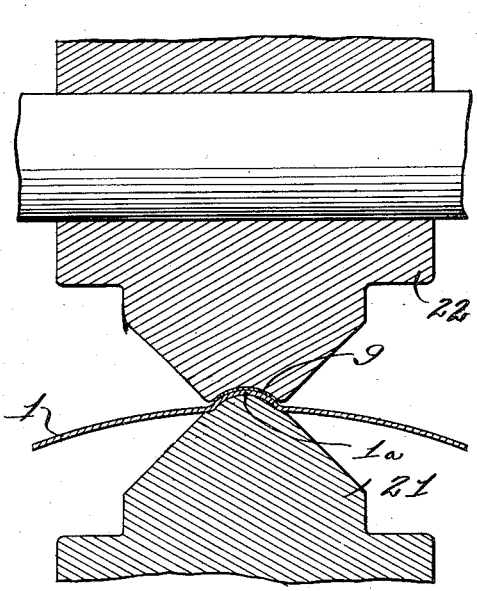
Figure 4 is a view showing a set of forming rolls which may be employed in forming a rib integral with the tire cover member and applying a strip of beading or molding thereto.
Figure 5:
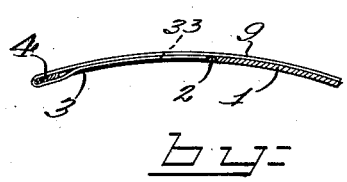
Figure 5 is a view, partly in section and partly in elevation, taken in substantially the plane of the line V—V in Figure 3 and showing the location of the end of the beading in relation to the opening adjacent the end of the tire cover member on which the beading is mounted.

The free end of the cross-sectionally arcuate strip 9 is arranged, before its securement, so that it overlies and projects beyond the adjacent anchorage 4 of the cover member 1 a predetermined amount, preferably to such an extent as to permit its being doubled upon itself as shown in Figure 5 to occupy the cut-out 2 in the corresponding end of the cover member 1. Any suitable tool such as a pair of pliers (not shown) may be employed for this purpose. The doubled over portions of the strip 9 are then united as by spot-welding as shown by the dotted lines at 33 in Figures 2 and 3.

The rib 1a is formed preferably, though not necessarily, at the center of the cover member 1, and the strip 9 is somewhat flattened transversely in its engagement with the convex surface of the rib 1a, with the result that the strip 9 is prevented from buckling due to the longitudinal curvature imparted to the strip and at the same time is caused to tightly engage the sides of the rib. Inasmuch as the application of the strip is almost completed at the time that the second end of the strip is secured to the corresponding end of the cover member 1, said second end is fastened in position without any appreciable reduction in the tension of the strip about the rib 1a.

If desired, the rib 1a may be omitted and a strip of the same or other thickness than that used with the rib could be employed.

The application of molding in accordance with this invention is not limited to split ring cover members, since the molding may be employed in connection with a continuous ring. In such event, some suitable anchorage means embodying the invention would be provided for the ends of the molding strip.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A tire cover comprising a tire embracing member having a transversely arcuate rib extending substantially throughout its length and anchors adjacent the ends of the rib, and a strip of molding overlying said rib throughout its length, the ends of said strip being looped about said anchors and secured to the body of said strip, said strip having a transversely arcuate shape of a normal curvature greater than the curvature of said rib, and when in engagement with said rib assuming substantially the same curvature as said rib, whereby the strip tightly grips the rib throughout its length.

2. A tire cover comprising an arcuate tire embracing member having a longitudinal transversely arcuate rib, and a strip of molding having a transverse curvature normally greater than that of the rib, and embracing said rib substantially throughout its length, said strip being transversely flattened when in engagement with said rib, whereby the edges of said strip grip said rib.

3. As an article of manufacture, a spare tire cover member having a bowed rib-like portion and a discontinuous strip of molding transversely bowed to fit over the bowed portion of the cover member and of such curvature that its edges are pressed into tight frictional engagement with the bowed portion of the cover member to frictionally bind it to the cover member, said strip having each of its ends turned back over an adjoining portion of the cover member and fastened to a contiguous outer portion of the strip for securing the strip in place on the cover member.

4. A tire cover member having a transversely arcuate rib extending substantially throughout its length and an anchor adjacent an end of the rib, and a strip of molding overlying said rib throughout its length, one end of said strip being looped about said anchor and secured to the body of said strip, means clamping the other end of said strip on said member, said strip having a transversely arcuate shape of a normal curvature greater than the curvature of said rib, and when in engagement with said rib assuming substantially the same curvature as said rib, whereby said strip tightly grips said rib throughout its length.

5. As an article of manufacture, a spare tire cover having a bowed rib-like portion and a discontinuous strip of molding transversely bowed to fit over the bowed portion of the cover member and of such curvature that its edges are pressed into tight frictional engagement with the bowed portion of the cover member to frictionally clamp it to the cover member, one end of the strip being turned back over an adjoining portion of the cover member and fastened to a contiguous outer portion of the strip for securing the strip in place on the cover member, and means mounting the other end of the strip in place on the cover member.

GEORGE ALBERT LYON.